No. 862,471. PATENTED AUG. 6, 1907.
I. M. HACKNEY.
COLD TIRE SETTING MACHINE.
APPLICATION FILED NOV. 23, 1903.

Witnesses:
Inventor:
Isaac M. Hackney
by Bakewell & Cornwall
attys.

No. 862,471. PATENTED AUG. 6, 1907.
I. M. HACKNEY.
COLD TIRE SETTING MACHINE.
APPLICATION FILED NOV. 23, 1903.

Witnesses:
Inventor:
Isaac M. Hackney,
by Bakewell & Cornwall
Attys.

No. 862,471. PATENTED AUG. 6, 1907.
I. M. HACKNEY.
COLD TIRE SETTING MACHINE.
APPLICATION FILED NOV. 23, 1903.
10 SHEETS—SHEET 5.

Fig. 5.

Witnesses:
Wm H Scott
G. A. Pennington

Inventor:
Isaac M. Hackney
by Bakewell & Cornwall
attys.

No. 862,471. PATENTED AUG. 6, 1907.
I. M. HACKNEY.
COLD TIRE SETTING MACHINE.
APPLICATION FILED NOV. 23, 1903.
10 SHEETS—SHEET 6.

Witnesses:
Inventor:
Isaac M. Hackney
by Bakewell & Cornwall
attys.

No. 862,471. PATENTED AUG. 6, 1907.
I. M. HACKNEY.
COLD TIRE SETTING MACHINE.
APPLICATION FILED NOV. 23, 1903.

Witnesses:
Wm. H. Scott
J. H. Gibbs

Inventor:
Isaac M. Hackney
by Bakewell & Cornwall
attys.

No. 862,471. PATENTED AUG. 6, 1907.
I. M. HACKNEY.
COLD TIRE SETTING MACHINE.
APPLICATION FILED NOV. 23, 1903.

UNITED STATES PATENT OFFICE.

ISAAC M. HACKNEY, OF WICHITA, KANSAS, ASSIGNOR TO THE BROOKS TIRE MACHINE COMPANY, OF WICHITA, KANSAS, A CORPORATION OF KANSAS.

COLD-TIRE-SETTING MACHINE.

No. 862,471.   Specification of Letters Patent.   Patented Aug. 6, 1907.

Continuation of application Serial No. 111,658, filed June 14, 1902. This application filed November 23, 1903. Serial No. 182,327.

*To all whom it may concern:*

Be it known that I, ISAAC M. HACKNEY, a citizen of the United States, residing at Wichita, Kansas, have invented a certain new and useful Improvement in Cold-Tire-Setting Machines, of which the following is a full, clear, and exact description, such as will enable others skilled in the art to which it appertains to make and use the same, reference being had to the accompanying drawings, forming part of this specification, in which—

This invention relates to a new and useful improvement in cold tire setting machines, the object being to construct a machine of the character described which will set a cold tire on a wheel without removing the tire or bolts from the wheel. By my improved machine, the tire can be set cold in from three to five minutes by having an extended surface contact along the edge of the tire by the gripping keys, which do not injure the tire in any way. The machine is operated by eccentric shafts, one of which is mounted in the stationary head and the other in the movable head. These eccentric shafts are connected by links and power may be imparted to one or both for the purpose of moving the movable head toward the stationary head. In order that the movement in the design of machine shown in the drawings may be understood, I will here state that the eccentric shaft in the stationary draw head is one-half inch off center and consequently by giving the same one-half a revolution an inch movement is imparted to the movable draw head. The eccentric in the movable draw head is three-sixteenths of an inch off center and one-half a revolution results in moving the movable draw head three-eighths of an inch towards the fixed draw head. Thus, the full movement given to the draw heads by these two eccentrics is one and three-eighths inches. The eccentric in the fixed draw head is employed for finally setting the grip keys and for taking up movement given by the eccentric in the movable draw head. This eccentric in the fixed draw head is also used for opening the machine and releasing the tire. On the eccentric mounted in the movable draw head is a large ratchet wheel which coöperates with a lever for compounding the leverage in setting heavy tires. In setting light tires, the lever may be placed in the small hub wrench on the front end of the eccentric in the movable draw head, which enables the operator to operate the movable draw head from either side.

To adjust the machine to wheels of different diameters, as, from a hind to a front wheel, it is only necessary to remove the bridge plate on which the tire rests and insert one having small radius for a wheel of small diameter. In wheels of smaller diameter adjusting wedges are used for the purpose of supporting the wheel on each side of the bridge plate, the wedges raising the outer ends of the keys until the tops of their teeth reach the inside edge of the tire.

The machine shown in the accompanying drawings is simple, strong and durable and is capable of setting different sizes of tires on different sizes of wheels with slight changes in the arrangement of the gripping devices and the wheel supports.

My invention consists in the construction, arrangement and combination of the several parts, all as will hereinafter be described and afterwards pointed out in the claims.

Figure 6:
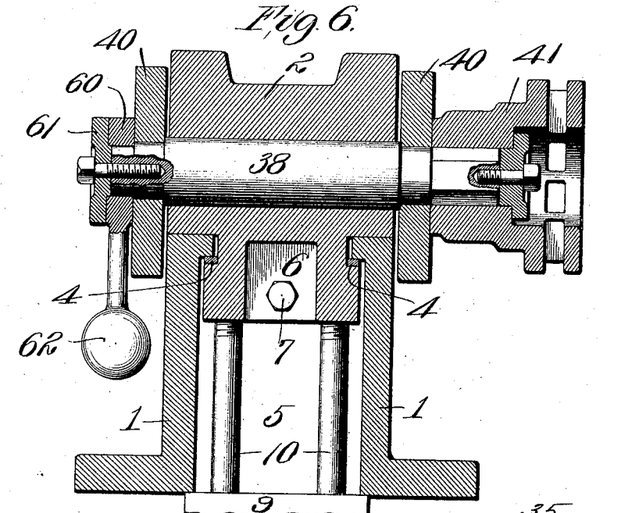
Fig. 6 is a vertical cross sectional view through the fixed head showing the power cam mounted therein taken on line 6—6 of Fig. 1.
Figure 15:
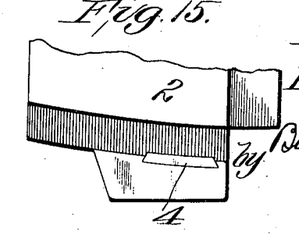
Fig. 15 is a detail view illustrating a portion of a draw head in side elevation and showing one of the removable wear shoes arranged therein.

In the drawings, 1 indicates a base casting, forming the support for the moving parts of the machine, which casting has its side walls formed as curved guide-ways upon which are mounted the fixed and movable heads. 2 is the fixed head and 3 the movable head. The head, as shown in Fig. 15, is provided with grooves in its lower side edges to take in the inwardly extending flanges of the base casting, the bottom walls of the grooves in the fixed head being provided with inserted wear plates 4 which engage under the flanges on the base casting, see also Fig. 6. The fixed head is laterally movable with respect to the base casting in order that it may accommodate itself in the operation of setting the tire. The movable head is also capable of lateral play to accommodate itself to a tire and I consider this feature of my invention as important because the wedge keys cannot be made to always act in unison so as to grip the tire uniformly on both sides. By making one or both heads laterally movable, they accommodate themselves to the tire depending upon the action of the grip keys and therefore when power is applied to the movable head, such power will act in the desired direction.

Figure 7:
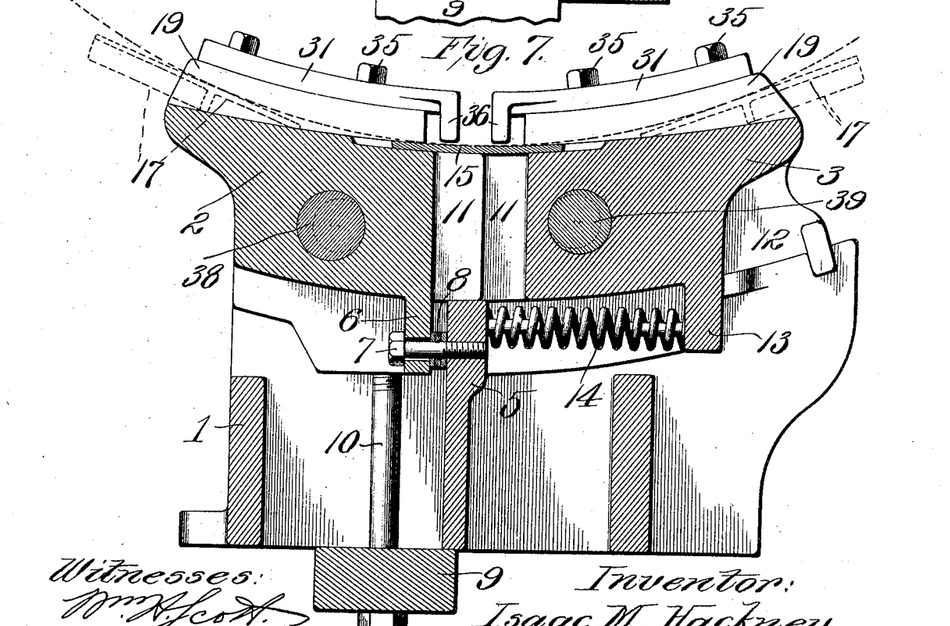
Fig. 7 is a vertical longitudinal sectional view showing the stationary and fixed heads, taken on line 7—7 of Fig. 4.

The base casting has a central partition wall 5, see Fig. 7, and the fixed head 2 has a downward extension 6 which is perforated for a bolt 7, said bolt being received by the wall 5. The opening in the extension 6 is of such size as to permit the head to play laterally without binding the bolt. Washers 8 are employed between the face of the extension 6 and the wall 5 to locate the fixed head in its proper position. To further strengthen the fixed head and resist any tilting inclination when in operation, I may use an anchor bar 9 extending under the base casting and connect the same by bolts 10 to the inner lower end of the fixed head. I however do not wish to be limited to the use of this anchor bar as the same may be dispensed with. Where the anchor bar is used, it should be so applied that it will not interfere with the lateral play of the fixed head in alining itself when the grip-keys are active.

The fixed head, and also the movable head is provided with overlapping extensions 11 illustrated as being in the form of interlocking tongues on their contiguous faces which rest upon the wall 5 and form a support for the bridge plate to be hereinafter described.

The movable head 3 is similar in construction to the fixed head with the exception that it has runners 12 which afford a more extended bearing on the curved run-way of the base casting. Also this movable head is provided with a downwardly extending lug 13, between which and the wall 5 is a spring 14 whose energy is exerted to hold the movable head in its outer position and away from the complementary head at all times.

Figures 18, 19:
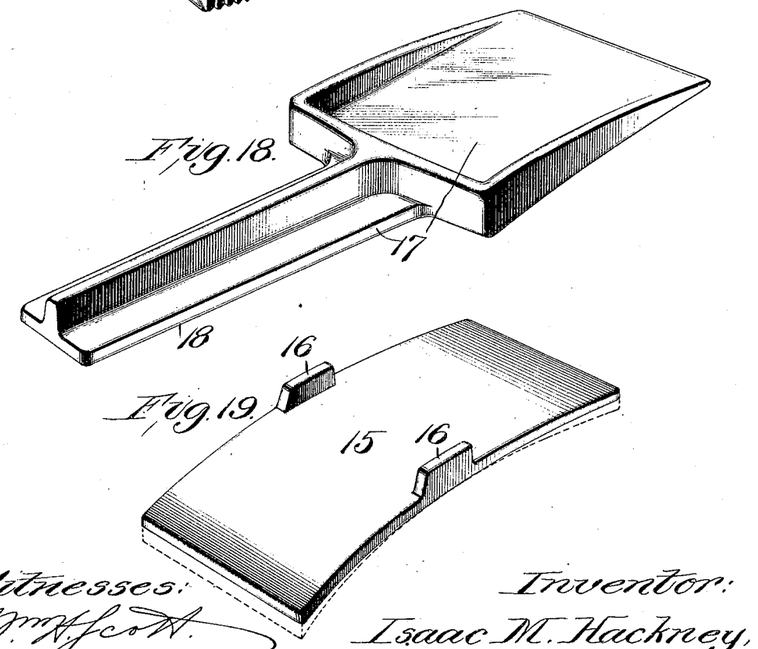
Fig. 18 is a detail view of one of the removable wedges designed to be inserted upon setting the tires of wheels of small diameter.
Fig. 19 is a detail view of one of the bridge plates to be used between the fixed and movable heads.

The upper faces of the fixed and movable heads are recessed to receive a bridge plate 15, see Figs. 7 and 19, which bridge plate is provided with downwardly extending lugs 16 which assist in holding it against lateral displacement. This bridge plate is supported upon the fixed and movable heads above the overlapping extensions 11 thereof and is inserted loosely in place so that it can accommodate the lateral movements of the head 2 as well as the longitudinal movement of the head 3 without binding. As this bridge plate forms a support for the tire between the gripping keys, and is under the point where the tire is being upset, it is evident that an important office to be performed by the bridge plate is that of providing a solid substantial support, otherwise the tire would have a tendency to bulge outward and also that the support so provided by the bridge plate will preserve the circle of the tire being set. To accomplish this, each machine is provided with three or more bridge plates whose upper faces are described upon circles of different diameters in order that each bridge plate may be used in connection with the wheel having a corresponding diameter.

I have not shown the different bridge plates in the drawings but in Fig. 19 I have illustrated, by dotted lines, how a bridge plate with its upper face described from a circle of small diameter would appear.

17 indicates movable wedges which are employed in connection with wheels of smaller diameter, their use being illustrated in Fig. 7. I will say here that the upper faces of the fixed and movable heads are designed to receive the largest standard size wheels so that when the tires on such wheels are being upset, no extra appliances are necessary. However, when a wheel of smaller diameter is to have its tire upset, a suitable bridge plate is introduced into the machine and when the wheel is arranged in position, the wedges 17 are driven in under the keys on each side of the wheel so as to raise the outer ends of the keys until the upper edges of their teeth reach the inner edge of the tire. These wedges are provided with handles or extensions 18 by which they may be manipulated and also driven home.

Figure 3:
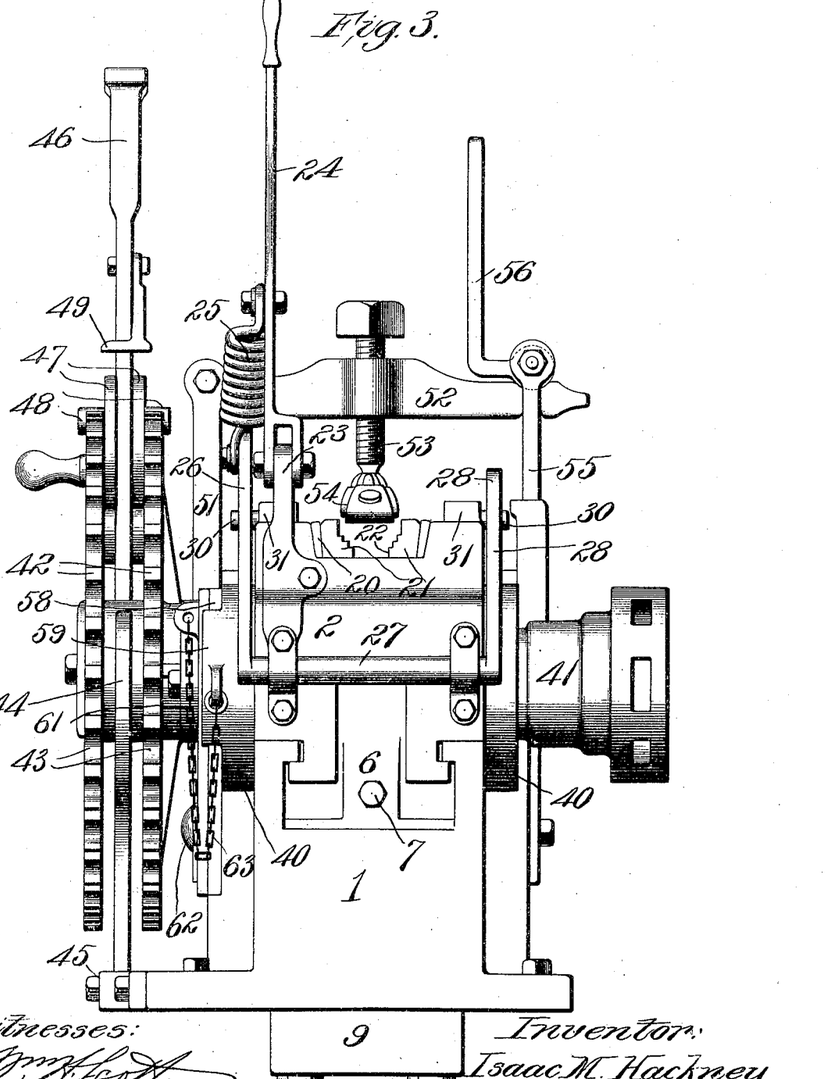
Fig. 3 is a side elevational view looking at the left hand end of the machine.
Figure 4:
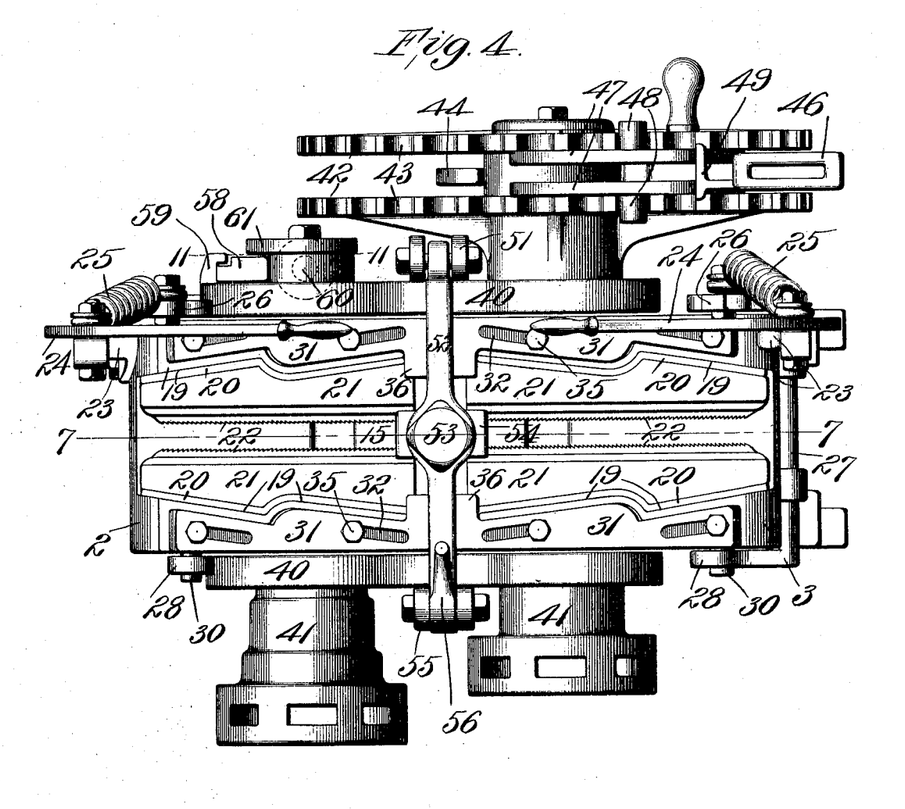
Fig. 4 is a top plan view.
Figures 16, 17:
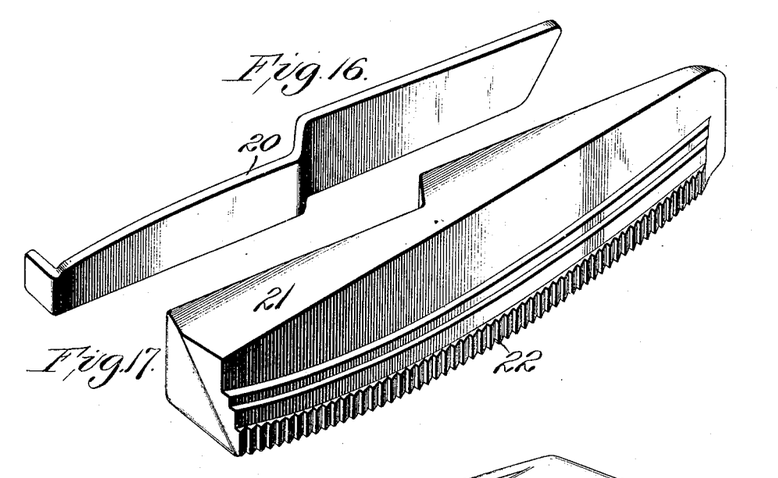
Fig. 16 is a detail view of a backing plate designed to coöperate between the cam faces and gripping jaw.
Fig. 17 is a detail view of one of the gripping jaws.

Each fixed and movable head is provided with upward extensions on each side, see Figs. 3, 4, 6 and 7, and the inner faces of these extensions are inclined so as to provide cam seats 19. These cam seats coöperate with removable wedge keys, the back or outer faces of the wedge keys being similarly inclined for obvious reasons. When the wedge keys are inserted in position, as shown in Fig. 4, it is obvious that any outward movement imparted thereto will cause said keys to ride inwardly on the cam seats 19 to grip the tire. These wedge keys are made of different widths in order to take in different tires and in some cases with extremely narrow tires it may be necessary to introduce backing plates 20 behind the wedge keys, see Figs. 4, and 16, which backing plates contribute to the width of the wedge keys. Each wedge key 21 is provided with serrations or teeth 22 preferably in the form of ratchet teeth, along its inner lower edge. The tire is designed to be gripped between these teeth and therefore the teeth preferably point inwardly to increase their biting effect.

It is obvious that as an outward movement is necessary to cause the gripping keys to grasp the tire some means must be provided to accomplish this motion. If the gripping keys were driven outwardly as by the blows from a hammer, their motion would not be uniform, and the tire would not be centered which would result in drawing upon the lateral motion of the heads at the setting of each tire. I prefer to provide means for moving the gripping keys outwardly to initially set them in position against the tire so that when the gripping keys are finally set, the motion necessary to effect such final setting would be comparatively slight, but at the same time, as uniform as possible.

Figure 1:
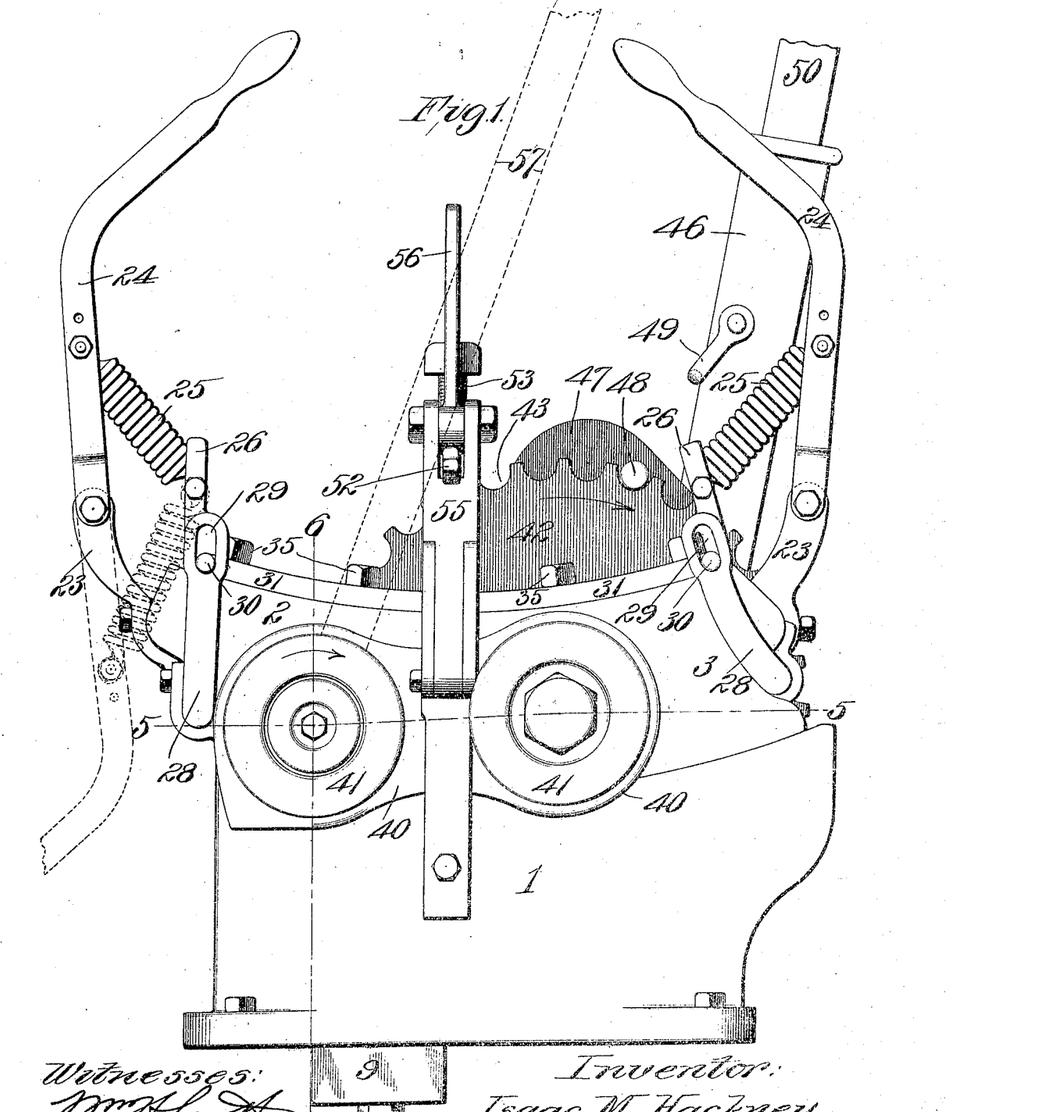
Figure 1 is a front elevational view of my improved machine.
Figure 2:
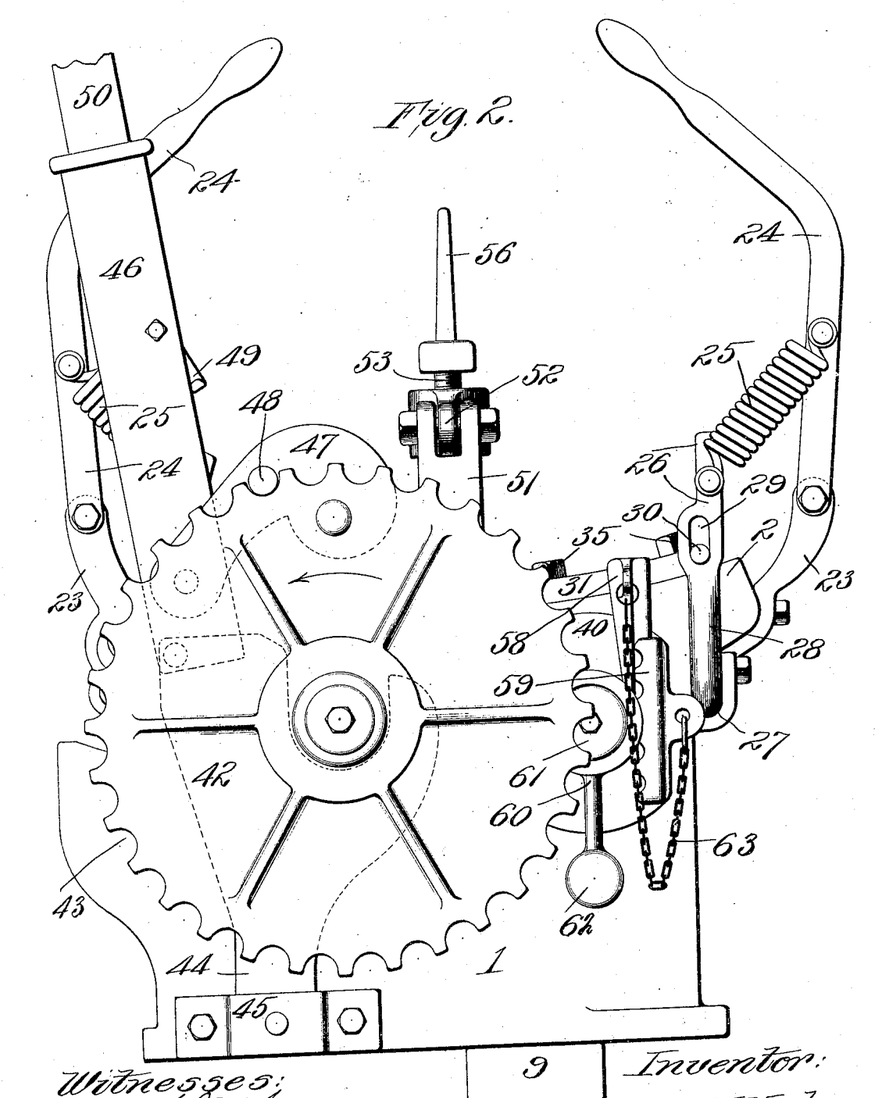
Fig. 2 is a rear elevational view.
Figures 11, 12:
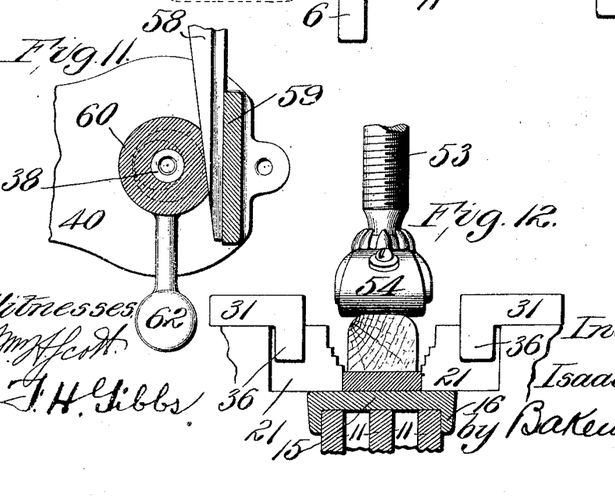
Fig. 11 is a detail view showing the lost motion and take-up device taken on line 11—11 of Fig. 4.
Fig. 12 is a detail view showing the felly clamp in operative position on a wheel whose tire is being set.
Figure 13:
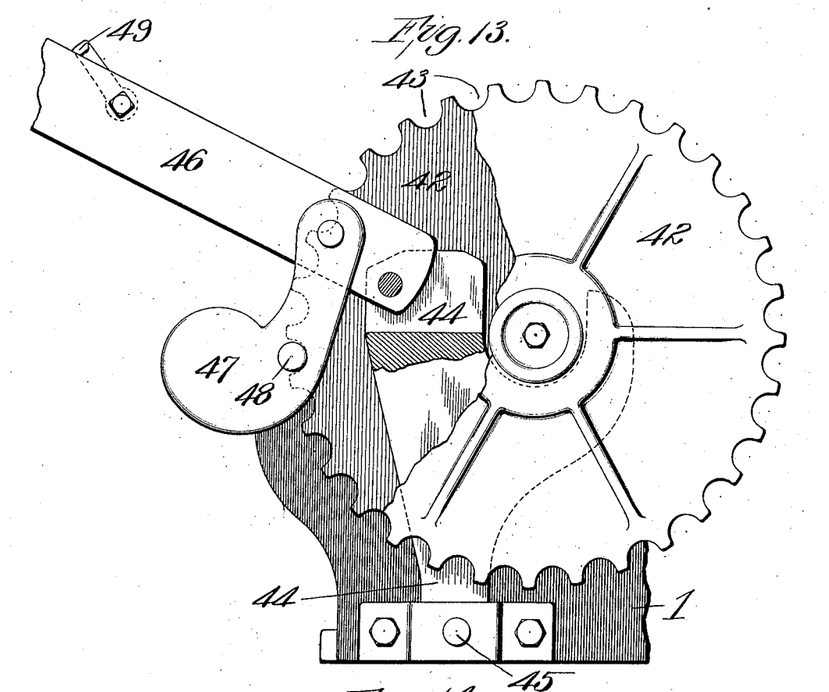
Fig. 13 is a detail view of the main operating lever for imparting power to the movable head.
Figure 14:
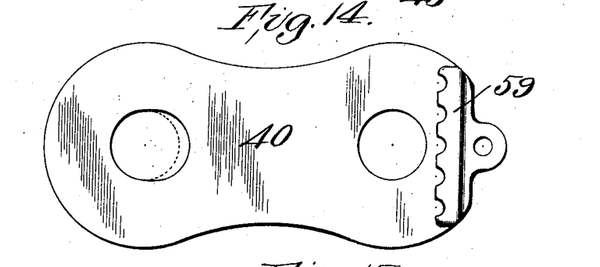
Fig. 14 is a detail view of the link which coöperates with the take-up key.

Referring now to Figs. 1, 2 and 3, it will be observed that each head is provided with a bracket 23 at its outer end, upon which is mounted an operating handle 24. This handle has connected to it a spring 25 whose other end is connected to a rocking member 26. This rocking member is connected to a rock shaft 27, see Fig. 3, which rock shaft carries at its opposite end a rocking member 28. Both the members 26 and 28 are slotted, as at 29, and in these slots are arranged pins 30 extending from the gripping key actuating devices illustrated as sliding plates 31. These sliding plates are held in position upon the faces of the raised portions of the heads and are provided with inclined slots 32, see Fig. 4, through which pass securing bolts 35. The inner end of each sliding plate 31 is bent downwardly, as at 36, see Figs. 7 and 12, to engage the inner ends of the gripping keys. When the tire is in position between the gripping keys, the handle 24 is grasped and turned down, the tension of spring 25 rocks the members 26 and 28, and the sliding plates 31 are moved outwardly in unison, their projections 36 picking up the gripping keys and moving them together, away from the center of the machine which results, due to the inclination of the inclined seats 19 in the gripping keys approaching each other so as to grasp the tire. The gripping keys should be of such width that the motion of the handle 24 will not be exhausted before the teeth of the gripping keys take hold, because the handle 24 moves past the dead center and is locked in such position, the spring 25 being held constantly under tension when the handle is depressed so as to be in readiness to take up any lost motion in the gripping keys in the event that inequalities in manufacture, dirt or other things interfere with their taking hold of the tire in the proper way at the proper time. It will thus be seen that the gripping keys are in yielding engagement with the tire but such yielding engagement will not effect the positive gripping action of the teeth to such an appreciable extent as to affect the successful operation of the machine. The gripping keys on the fixed and movable heads are provided with corresponding mechanism for initially setting the gripping keys.

Figure 5:
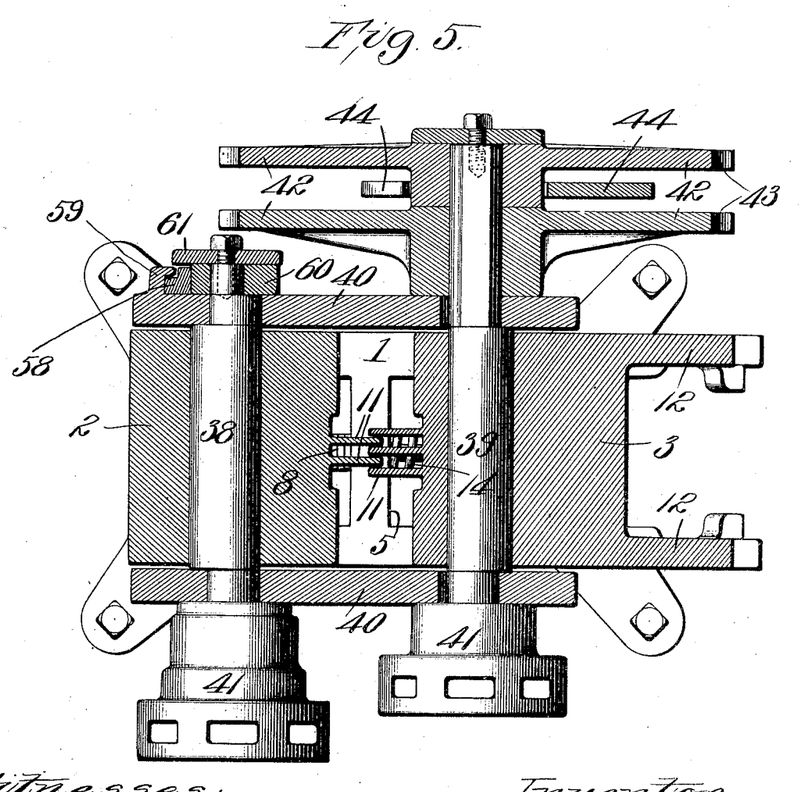
Fig. 5 is a horizontal sectional view through the fixed and movable heads showing the arrangement of the power cams and links taken on line 5—5 of Fig. 1.

The fixed head furnishes a bearing for an eccentric shaft 38, see Fig. 5, and the movable head has also an eccentric shaft 39 mounted therein. These eccentric shafts find bearings in links 40, the openings in the links for receiving the eccentric shaft 39 being elongated slightly, for purposes to be hereinafter described.

The front ends of the shafts 38 and 39 are non-circular in section and on these non-circular shanks are fitted socketed hubs 41, designed to receive bearings in their sockets in order that the shafts may be rotated through the medium of these hub wrenches. The rear end of shaft 38 carries a take-up device, and the rear end of shaft 39 carries a power-compounding device. I will first describe the power device for moving the movable head inwardly.

The links 40 being mounted upon the shaft 38 in the fixed head, may, in the rotation of the shaft 39 oscillate to accommodate the throw of the eccentric shaft 39 which bears at the outer end of the slot when power is being applied to the shaft. Referring to Figs. 3, 4, 5 and 13, it will be seen that the rear end of shaft 39 is non-circular in section, and on the shank thus provided are two companion ratchet wheels 42, the peripheries of these ratchet wheels being formed with semi-circular recesses 43. 44 indicates a fulcrum block pivoted at 45 to the base casting, and which is recessed to receive the hub of one of the wheels 42. A lever 46 is pivoted upon this fulcrum block and this lever carries two weighted dogs 47, which are pivoted on each side thereof near its fulcrum point, each dog carrying lateral projections 48 designed to engage the semi-circular recesses in the peripheries of the ratchet wheels 42. A stop 49 is also pivoted to the lever 46 to coöperate with the weighted dogs to hold them on the upper side of the lever in certain operations of the machine. The lever 46 is preferably provided with a socket in its outer end, see Fig. 2, in which is mounted a removable extension 50.

Figures 20, 21, 22:
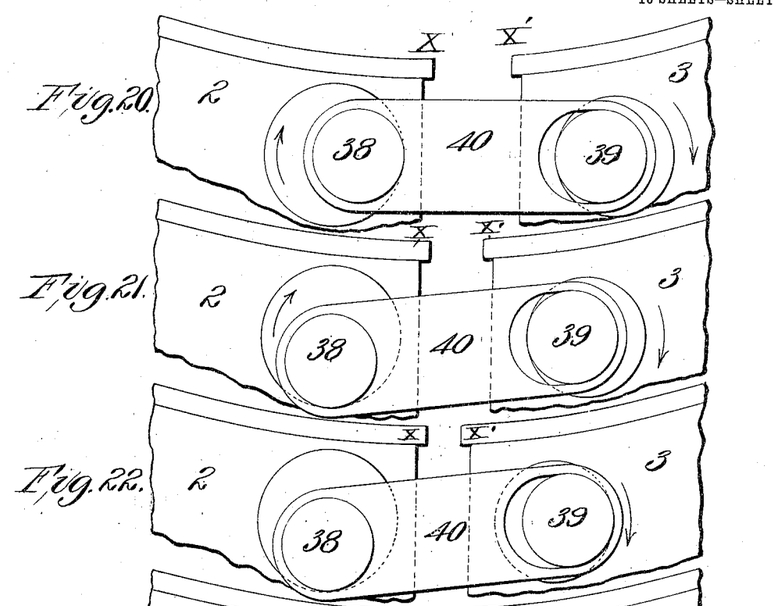
Figs. 20 to 25 inclusive are diagrammatic views illustrating the operations of setting the tire.

Referring now to Fig. 20 where the heads are shown separated, it will be obvious that half of a revolution being imparted to the shaft 39 causes the head 3 to move towards the stationary head 2, the links 40 being placed under tension in this action. This movement of head 3 towards head 2 may be effected by rotating the shaft 39 in either direction from its position shown in Fig. 2 but I prefer to arrange the ratchet dogs on top of the wheel, as shown in Fig. 2, in order that the power imparted to the shaft through the lever 50 will be on the drawing stroke so far as the operator is concerned, instead of on the lifting stroke which would result should the dogs be in the position shown in Fig. 13. This motion imparted to shaft 39 is in the direction of the arrow shown in Figs. 1 and 2.

I will now describe the operation of my improved machine.

Figure 8:
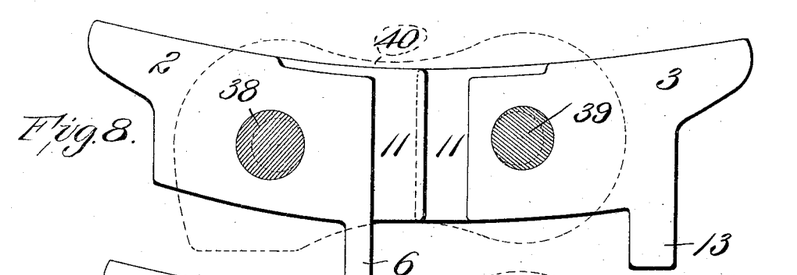
Figs. 8, 9, 10 are detail views showing different positions of the fixed and movable heads.
Figure 9:
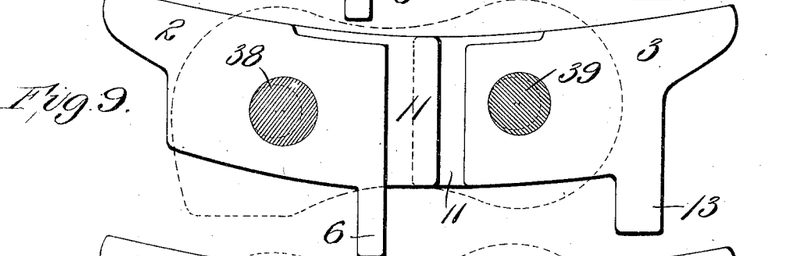
Figure 10:
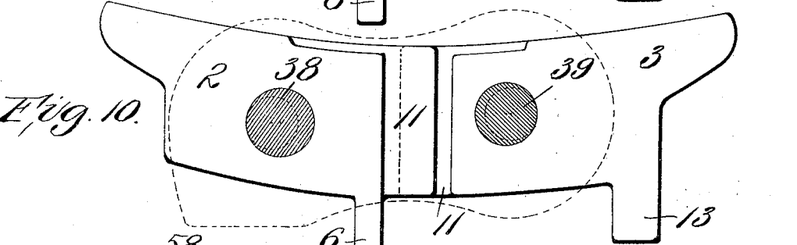

The bridge plate 15 with the proper curvature to its upper face is inserted in position and the wedge keys of proper width are also placed in position. The wheel is now introduced between the wedge keys and the wedges 17 are employed if necessary. The next operation is to throw down the levers 24 to initially set the wedge keys against the tire. The movable head during all of these operations is away from the fixed head, the shafts 38 and 39 being in the positions shown in Figs. 8 and 20. A felly clamp is now arranged in position to hold the wheel down in its seat and this felly clamp consists of a bracket 51 extending up from the rear face of the frame plate, said bracket carrying a cross piece 52 which is pivoted to its upper end, see Fig. 3. This cross piece has a screw shaft 53 mounted therein, said screw having a head by means of which it may be turned, the lower end of said screw swiveling in a clamping head 54, see Fig. 12, which is designed to contact with the felly of the wheel. 55 indicates a standard pivoted to the front face of the base framing and whose upper end is bifurcated. The lever 56 is mounted in the bifurcated end of this standard, the hub of which lever is in the form of an eccentric so that after the felly clamp 54 has been adjusted manually against the felly of the wheel, the lever 56 may be raised and finally clamp the swiveled head 54 against the felly. The wheel is now secured in position and the next operation is to finally set the gripping keys which is accomplished preferably by inserting a bar 57, see dotted lines Fig. 1; in the hub wrench of shaft 38 which hub is now rotated to the right or in the direction of the arrow shown in Fig. 1 forcing the gripping keys firmly into the tire and drawing the movable head toward the fixed head until the parts assume substantially the position shown in Fig. 21. During all of this time the shaft 39 has remained idle and after the tire has been gripped and the resistance becomes too great for the lever 57 to be longer effective, the lever 50 is operated so as to rotate the shaft 39 in the direction of the arrow shown in Fig. 20. A succession of movements imparted to the lever 50 will result in the weighted dogs driving the companion ratchet wheels with considerable power so that the movable head is forced toward the fixed head when the shaft 39 has made one-half of a revolution to substantially the position shown in Fig. 22.

It will be obvious from the position shown in Fig. 20 to the position shown in Fig. 21, that some means must be provided for locking the shaft 38 against backward rotation, otherwise the rotation of shaft 39 will be ineffective. This means consists in a take-up key whose construction is best shown in Figs. 2, 4, 5 and 11. This take-up key, indicated at 58, is in the form of a wedge operating between a fixed abutment in the form of a guide-way 59 on the rear link 40, and a flat-faced weighted collar 60 loosely mounted on the rear end of shaft 38, a washer 61 being provided for holding the weighted collar 60 in position.

62 indicates the weight or pendant which is employed for the purpose of presenting the flat face of collar 60 at all times towards the abutment 59.

To prevent misplacement, a chain 63 is preferably connected to the take-up wedge 58.

The fixed head affording a bearing for the shaft 38 will naturally, upon the rotation of the shaft 38, displace the links in proportion to the part of a revolution imparted to the shaft 38. Thus, when the shaft is in the position shown in Fig. 20 the eccentric bearing which carries the links 40 is nearest the movable head, and when shaft 38 is rotated to draw the movable head towards it, as for instance, in finally setting the gripping keys, the parts being in the position shown in Fig. 21 after this operation, the abutment 59 will be moved outwardly or away from the flat-faced collar 60. The take-up wedge will automatically fall (by gravity) into the widened space and when the limit of motion, imparted by the handle 57 is reached, it follows that the shaft 38 will be locked in its new position or in the position shown in Figs. 21 and 22. To insure the take-up wedge being home, it may be struck a blow by a hammer, as will be readily understood.

After the parts have reached the position shown in Fig. 21 power is applied to the shaft 39 either through the hub wrench 41 if a light tire is to be set or through the compound leverage arrangement through the medium of the handle 50. In any event, the half revolution imparted to shaft 39 will result in moving the head 3 towards the stationary head until the throw of the eccentric shaft 39 is exhausted.

Figures 23, 24, 25:
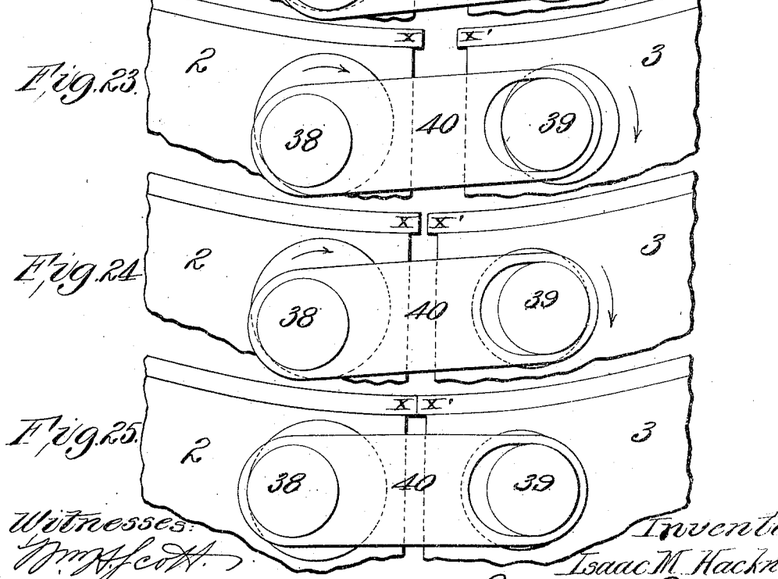

Means are provided for taking up lost motion and avoiding the return of the movable head to its former position after the eccentric shaft 39 has exhausted its throw, otherwise the spring 14 would tend to loosen the grip of the gripping keys. This means consists of the lever 57 which is left in the socket-wrench on the end of shaft 38 so as to provide an over-balancing weight which becomes effective to rotate the shaft 38 the instant that the shaft 39 has exhausted its throw and starts to return on the second half of its revolution. Weight 57 drops gradually and rotates the shaft 38 in the direction of the arrow causing the links to move toward the left to retain the ground gained by the previous inward movement of head 3. Not only are the links forced outwardly by the dropping of lever 57, the links bearing on shaft 39 in the meanwhile, but the take-up wedge automatically drops, due to the widening of the space between the flat face of the collar and the abutment 59, so that when the shaft 39 is in the position shown in Fig. 23 in readiness to have the power again applied thereto to force the head 3 inwardly, the shaft 38 has moved to the position shown in said Fig. 23 and the take-up wedge now locks shaft 38 in its new position to prevent backward rotation thereof as before described. The next operation of the shaft 39 from the position shown in Fig. 23 to the position shown in Fig. 24 will cause the head 3 to move inwardly, as before described, until the eccentric shaft 39 has exhausted its throw when the operation of taking up motion during the time that the shaft 39 is on the second half or return portion of its revolution is repeated as before by the lever 57 dropping until the shaft 38 is in the position shown in Fig. 25 and the take-up wedge is home. The final operation of rotating the shaft 39 is now repeated until the shaft has exhausted its throw, as shown in Fig. 25. It will be seen from the above that the head 3 has moved from its outermost position to its innermost position and if we assume that the parts marked X and X' represent points of a tire, that said points will have been moved from their separated position to a position of coincidence. Of course, this does not actually happen in upsetting tires but diagrammatically, we have illustrated the tire as having been cut, the contiguous ends being drawn together.

If the bearings for the links on shaft 38 are one-half inch off center, the eccentric shaft thus having a one inch throw, and if the bearings for the links on shaft 39 are three-sixteenths of an inch off center so that the eccentric shaft 39 has three-eighths of an inch throw, it follows that the distance traveled by the movable head starting from a position where the throws of the eccentric shafts are in opposition and the heads are most widely separated will be equal to the total of the throws of both shafts or one and three-eighths of an inch. This distance may be divided as follows: After a wheel has been placed in position and the levers 24 depressed, the operation of lever 57, in finally fixing the gripping keys and initially setting the tire (if it is light enough to be set by the application of manual power applied through this medium), will consume one-half of an inch movement. The first half revolution of shaft 39 will move the head 3 three-eighths of an inch closer to the fixed head, making a total movement of the head when the parts are in the position shown in Fig. 22, of seven-eighths of an inch. The next movement of the head starts when the parts are in the position shown in Fig. 23 and the next half revolution of the shaft 39 will move the head 3 another three-eighths of an inch closer to the fixed head or to the position shown in Fig. 24, making in all, a movement of one and one-eighth inches. The next movement is effected after the shaft 38 has been placed in the position shown in Fig. 25 and the shaft 39 again rotated but in this instance the full stroke of the eccentric on shaft 39 is not imparted to the links because of the insufficient throw of the eccentrics on shaft 38, consequently there is only one quarter of an inch movement imparted to the head 3 on the final operation of shaft 39 which makes a total of one and three-eighths inches movement imparted to the head 3 from its outermost to its innermost position.

To release the wheel after the tire has been set, the levers 24 are first thrown up to deprive the gripping keys of the tension of springs 25, and the lever 57 moved in the opposite direction to reversely rotate the shaft 38. The elongated slots in the links 40 accommodate this movement to some extent so as to release the take-up wedge 58 which may now be removed. Power may also be applied to reversely rotate the ratchet wheels 42 so as to cause the head 3 to move outwardly to release the gripping keys. The handle 56 is now depressed to release the felly clamp which may be thrown back and the wheel taken out of the device. The spring 14 assists the head 3 in its outward movement.

In setting heavy tires, there is never sufficient amount of pressure yielded by spring 14 to release the gripping keys and thus the elongations in the links prevent the opening of the machine on the last half turn of the eccentric in the movable draw head should the lever 57 be left out of its socket. The elongations in the links allow the operator to up-set the tire and successfully operate the machine without placing the lever 57 in the eccentric hub 41 until after he has turned the eccentric in the movable draw head one revolution.

Spring 14 takes up all lost motion and is very essential to the successful operation of the machine, since if there were no means for taking up lost motion the machine would be partly ineffective to the extent that the lost motion would have to be taken up by the large eccentric, as the movable draw head would slide toward the stationary head of its own weight until the eccentric came in contact with the inner walls of the elongated slots in the links to arrest its inward movement.

This application is a continuation of an application, so far as the principal features are concerned, filed by me on or about June 14, 1902, Serial No. 111,658.

I am aware that minor changes in the construction, arrangement and combination of the several parts of my device can be made and substituted for those herein shown and described without in the least departing from the nature and principle of my invention.

Having thus described my invention, what I claim as new and desire to secure by Letters Patent is:

1. In a machine of the character described, the combination with a supporting base, of relatively movable heads mounted thereon and having inclined seats, gripping keys for extensive engagement with the sides of a tire and having longitudinal movement in the respective heads, and yielding actuated means bearing against the inclined seats for simultaneously moving the separate keys in the respective heads longitudinally of their seats and forcing them toward the longitudinal center of the head; substantially as described.

2. A tire setting machine having inclined seats, longitudinal gripping keys to engage the sides of the tire and movable along said seats, longitudinal sliding plates engaging said gripping keys, and means for moving said sliding plates in unison; substantially as described.

3. A tire setting device having inclined seats, gripping keys coöperating with said seats, longitudinal sliding plates in engagement with said gripping keys and movable to impart a transverse movement to each gripping key, a rock shaft having arms connected to said sliding plates, a lever, and a spring connecting said lever to one of the rock arms of the shaft; substantially as described.

4. In a machine of the class described, the combination with a supporting base, of a fixed and a movable head mounted thereon, means for moving the movable head, inclined seats in the respective heads, gripping keys movable along said seats, and independent and yielding means for moving said keys into position to initially grip the tire; substantially as described.

5. In a machine of the character described, the combination with a supporting base having a fixed and a movable head mounted thereon, said heads having inclined seats, of pairs of gripping keys arranged in each head and movable along said inclined seats, means for causing said pairs of gripping keys to operate in unison, and yielding power devices on the respective heads for initially setting the gripping keys in gripping position against the tire; substantially as described.

6. In a machine of the character described, the combination with a supporting base, of a fixed and a movable head mounted thereon so as to have free lateral movement, and an anchor bar connected to said fixed head, which anchor bar also permits lateral adjustment of said head; substantially as described.

7. In a machine of the class described, the combination with a supporting base, of a fixed head and a movable head, shafts carried by the heads and having eccentric portions, means for applying power to intermittently force the movable head toward the fixed head, said means including links mounted on the eccentric portions of the respective shafts, a take-up device which is effective after each application of power, which take-up device consists of a wedge-shaped element adapted to bear against a portion of one of the links, and a rotating device between which and the contacting portion of the link the wedge-shaped element is interposed; substantially as described.

8. In a machine of the class described, the combination with a fixed and a movable head, shafts carried by the heads and having eccentric portions, links mounted in and connecting the eccentric portions of the shafts, a concentric portion on one of the shafts, a collar on the concentric portion of the shaft, and a take-up device interposed between the links and the collar; substantially as described.

9. In a machine of the class described, the combination with a fixed and a movable head, eccentric shafts in the heads, link connections between the shafts, a concentric portion on one of the shafts, a flat-faced weighted collar mounted on the concentric portion of the shaft, an abutment on the link adjacent to said flat-faced collar, and a take-up wedge 58 operating between the flat face of the collar and said abutment; substantially as described.

10. In a machine of the character described, the combination with a fixed and a movable head, eccentric shafts mounted therein, links arranged on said eccentric shafts, an overbalancing weight on the eccentric shaft mounted in the fixed head, and a take-up device also coöperating with said eccentric shaft; substantially as described.

11. In a machine of the character described, the combination with a fixed and a movable head, of eccentric shafts mounted therein, means for applying power to force the movable head toward the fixed head, an overbalancing weight which is operative to rotate the eccentric in the fixed head when the eccentric in the movable head is not actively engaged in forcing the movable head toward the fixed head, and a wedge-shaped take-up device for locking the eccentric and the fixed head in adjusted positions; substantially as described.

12. In a machine of the character described, the combination with a supporting base, of a fixed and a movable head, of eccentric shafts mounted in said heads, links connecting said shafts, an overbalancing weight and a take-up device coöperating with the shaft in the fixed head, and an elongated opening in the links for permitting the eccentric to turn in the movable draw head the last half revolution; substantially as described.

13. In a machine of the character described, the combination with a supporting base, of a fixed and a movable head mounted thereon, eccentric shafts having different throws mounted in said heads, links mounted on said eccentric shafts, hub wrenches on the forward ends of said shafts, a take-up device operating between the link and the rear end of the eccentric shaft mounted in the fixed head, and a power device mounted on the rear end of the eccentric shaft in the movable head; substantially as described.

14. A machine for setting tires in a cold condition, comprising a fixed head, a draw-head movable toward and from the said fixed head, gripping devices on the said heads to engage and hold a tire, an actuating device for imparting initial sliding movement to the draw-head, the said actuating device being arranged on the fixed head and connected with the draw-head, a locking device for the said actuating device, and means for imparting a final sliding motion to the said draw-head; substantially as described.

15. A machine for setting tires in a cold condition, comprising a fixed head, a slidable draw-head, gripping devices on the heads for holding a tire, shafts journaled in the said heads and having eccentrics, links in which the eccentrics are journaled so that when the fixed head shaft is turned an initial movement is given to the draw-head, and a locking device for locking the said fixed head shaft against reverse movement after it is turned, so that when the draw-head shaft is subsequently turned a final movement is given to the draw-head; substantially as described.

16. A machine for setting tires, comprising a fixed head, a draw-head movable toward the said fixed head, gripping jaws held on the said heads for holding a tire, a felly clamp comprising a pivoted cross bar, a screw rod mounted therein, a block for engaging the felly at the inside thereof and having a ball and socket connection with the said screw rod, a link, and a manually controlled cam on the said link engaging the free end of the said cross bar; substantially as described.

17. A machine for setting tires, comprising a fixed head, a movable draw-head, each head having inclined seats, means for moving the said draw-head, gripping jaws held on the said heads, and devices mounted to slide on the said heads and bearing against the inclined seats in an oblique direction and having arms engaging the said gripping jaws for imparting movement to the said gripping jaws; substantially as described.

18. A machine for setting tires, comprising a fixed head, a movable draw-head, each head having inclined seats, means for moving the said draw-head, gripping jaws held on the said heads, devices mounted to bear against the inclined seats and to slide on the said heads in an oblique direction and engaging the said gripping jaws, and means for imparting movement to the said devices, the said means comprising slotted arms engaging transverse pins on the said devices, hand levers, and springs connecting the hand levers with the said slotted arms; substantially as described.

19. A machine for setting tires, having a fixed head, a draw-head mounted to slide toward and from the fixed head, shafts journaled in the said heads and carrying eccentrics, a collar on the shaft in the fixed head, links in which the said eccentrics are journaled, a locking device comprising an approximately circular device hung upon a concentric portion of the fixed head shaft adjacent to the collar and having a flattened surface, a guideway fixed on one of the links, and a wedge slidable in the said guideway to engage the said flattened surface; substantially as described.

20. A tire-setting machine, having a gripping device for the tire comprising gripping jaws having wedge-shaped outer sides, heads carrying the jaws and having offsets formed with wedge-shaped inner sides engaged by the outer sides of the said jaws, and devices mounted to slide obliquely and having arms engaging the inner ends of the jaws to move the latter in gripping contact with the tire edges; substantially as described.

21. A tire-setting machine, having a gripping device for the tire comprising gripping jaws having wedge-shaped outer sides, head carrying the jaws and having offsets formed with wedge-shaped inner sides engaged by the outer sides of the said jaws, actuating devices mounted to slide obliquely and engaging the inner ends of the jaws to move the latter in gripping contact with the tire edges, and means for imparting a sliding movement to the said devices comprising slotted arms engaging transverse pins on the said bars, springs connected with the arms, and hand levers connected with the said springs; substantially as described.

22. A tire-setting machine having a pair of gripping jaws mounted to slide on fixed wedge-shaped faces, devices having arms engaging the ends of the said gripping jaws, the said devices having oblique slots engaging fixed bolts, slotted arms mounted to swing, engaging transverse pins on the said bars, a spring connected with one of the arms, and a hand lever connected with the said spring; substantially as described.

23. In a machine of the class described, the combination with a supporting base, of two heads mounted thereon, one of which is movable with relation to the other, gripping keys carried by said heads and having inclined sides, obliquely movable means carried by the heads and contacting with the inclined sides of the keys to move said keys toward each other, and bearings on the heads against which the obliquely movable means bear; substantially as described.

24. In a machine of the class described, the combination with a supporting base having a fixed and a movable head mounted thereon, obliquely and longitudinally movable devices supported on the upper faces of said heads and having inclined seats, bearings on the heads for coöperation with the obliquely and longitudinally movable devices, gripping keys supported above the upper faces of the heads and movable toward each other by the longitudinally and obliquely movable devices, and independent means on each of the heads for operating the longitudinally movable devices to cause the gripping keys to move in unison to grip the tire; substantially as described.

25. In a machine of the class described, the combination with a supporting base, of a fixed head and a movable head on said base, a power device adapted to move the movable head progressively in a succession of short steps in the same direction, toward the fixed head, said power device being recovered after each operation effecting a step in advance of the movable head and leaving the movable head in its new position, and a take-up device for rendering the next stroke of the power device effective whereby the movable head is forced to occupy a new position in advance and toward the fixed head, said take-up device comprising a substantially wedge-shaped member which is located between a stationary abutment and a part that is connected to the movable head; substantially as described.

26. In a tire-up-setting machine, the combination with two heads one of which is movable with respect to the other, an eccentric shaft in one of said heads, a shaft in the other of said heads, links connecting said shafts, a projection on one of the links, and a take-up device comprising a wedge insertible between said projection and an adjacent part of the machine, a power device on one of the eccentric shafts, the said take-up device compensating for part of the movement of the head resulting from the first stroke of the power device and rendering said power device effective on its succeeding stroke; substantially as described.

27. A machine for setting wheel tires comprising a supporting base carrying a fixed and a movable head, a power device adapted to move the movable head progressively toward the fixed head, longitudinally movable gripping keys carried by said heads, and wedge-shaped members adapted to be inserted under said gripping keys for adjusting them to tires of different diameters; substantially as described.

28. A machine for setting wheel tires comprising a supporting base carrying a fixed and a movable head, and a pair of tapered gripping keys movably mounted in each head, said movable head being constructed to move laterally of the base so that the wheel tire will not be bent laterally in case the gripping keys are not arranged evenly; substantially as described.

29. A machine for setting wheel tires comprising a frame carrying a fixed head provided with longitudinally movable gripping keys and a movable head provided with a pair of longitudinally movable tapered gripping keys and constructed to move laterally of the base to prevent the tire from being bent laterally in case the gripping keys are not arranged evenly, a power device for actuating the movable head, and a take-up device coöperating with said power device; substantially as described.

In testimony whereof, I hereunto affix my signature, in the presence of two witnesses, this eighteenth day of November 1903.

ISAAC M. HACKNEY.

Witnesses:
N. E. Pressey,
Lizzie Miller.